(12) United States Patent
Colomb et al.

(10) Patent No.: US 11,261,096 B2
(45) Date of Patent: Mar. 1, 2022

(54) CONTROLLED SILICON POLYMER TREATMENT METHOD

(71) Applicants: Mitsubishi Polycrystalline Silicon America Corporation (MIPSA), Theodore, AL (US); MITSUBISHI MATERIALS CORPORATION, Tokyo (JP)

(72) Inventors: Matthias Colomb, Theodore, AL (US); Rick Deckbar, Theodore, AL (US); Bryan Nettles, Mobile, AL (US)

(73) Assignees: Mitsubishi Polycrystalline Silicon America Corporation (MIPSA), Theodore, AL (US); MITSUBISHI MATERIALS CORPORATION, Tokyo (JP)

(*) Notice: Subject to any disclaimer, the term of this patent is extended or adjusted under 35 U.S.C. 154(b) by 700 days.

(21) Appl. No.: 16/023,648

(22) Filed: Jun. 29, 2018

(65) Prior Publication Data
US 2019/0002296 A1  Jan. 3, 2019

Related U.S. Application Data

(60) Provisional application No. 62/527,505, filed on Jun. 30, 2017.

(51) Int. Cl.
*C01B 33/12* (2006.01)
*C01B 33/035* (2006.01)

(52) U.S. Cl.
CPC ............ *C01B 33/12* (2013.01); *C01B 33/035* (2013.01)

(58) Field of Classification Search
CPC ....... C01B 33/12; C01B 33/035; C01B 33/00; C30B 23/00; C30B 23/005; C30B 23/02; B05D 2518/10
See application file for complete search history.

(56) References Cited

U.S. PATENT DOCUMENTS

| 7,875,349 B2 * | 1/2011 | Endoh ................... C01B 33/035 428/348 |
| 2005/0205206 A1 * | 9/2005 | Lembersky ........... B08B 7/0035 156/345.5 |

* cited by examiner

*Primary Examiner* — Smita S Patel
(74) *Attorney, Agent, or Firm* — Locke Lord LLP

(57) ABSTRACT

A polymer inactivation method for a polycrystalline silicon manufacturing device, wherein the polymer byproducts are treated and additionally treated in a manner that controls the rate of reaction. The polymer byproducts are treated with a first inert gas under partial vacuum and a second oxygen containing gas to convert the polymer byproducts. The reaction rate can be controlled by regulating the fill pressure of reactant gas, controlling the amount of oxygen in the reactant gas, and stripping of the raw polymer with heat and or a vacuum. The solid byproduct remaining after treating the polymer, which is predominately silicon suboxides ($SiO_x$) and silicon dioxide ($SiO_2$), is inert and is easily removed.

10 Claims, 14 Drawing Sheets

CONTROLLED SILICON POLYMER TREATMENT METHOD

BACKGROUND OF THE INVENTION

1. Field of the Invention

The present invention relates to a method of inactivating polymers adhered to the inner surface of a reacting furnace and its associated piping in a polycrystalline silicon manufacturing device.

2. Description of Related Art

A manufacturing device employing Siemens method is known as a polycrystalline silicon manufacturing device. In the polycrystalline silicon manufacturing device, a number of silicon seed rods are arranged in a reacting furnace. The silicon seed rods in the reacting furnace are heated and raw material gas including chlorosilane and hydrogen is supplied to the reacting furnace to come into contact with the heated silicon seed rods. On the surface of a silicon seed rod, polycrystalline silicon is produced by a hydrogen reduction reaction and a thermal decomposition reaction of the raw material gas represented by the following reaction formulas (1) and (2).

$$SiHCl_3 + H_2 \rightarrow Si + 3HCl \tag{1}$$

$$4SiHCl_3 \rightarrow Si + 3SiCl_4 + 2H_2 \tag{2}$$

The exhaust gas produced by the reactions include silicon tetrachloride which is a byproduct, unreacted chlorosilane gas, silicon powders, polymer compounds including $Si_2Cl_6$, $Si_2H_2Cl_4$ and the like, hydrogen gas and hydrogen chloride. The polymer compounds are cooled in the reactor furnace and the exhaust gas piping and are thus precipitated on inner circumferential surfaces of the piping and the reacting furnace. Since the polymers easily ignite upon exposure to air, it is necessary to inactivate them.

Currently, the method described in Japanese Patent No. 2818780 is employed to inactivate the polymers. In this method, chlorosilane such as silicon tetrachloride ($SiCl_4$) is injected into the exhaust piping of a polycrystalline silicon manufacturing device and the adhered polymers are dissolved and removed by the chlorosilane.

However, when the remaining $SiCl_4$ is exposed to air, safety hazards including the generation of a large amount of hydrochloric acid gas may occur. Thus, in attempting to safely inactivate the polymers, additional hazards are created.

A method for treating the silicon polymers is sought which minimizes safety risks to workers.

BRIEF SUMMARY OF THE INVENTION

The present invention was developed in view of this. The object of the present invention is to safely inactivate the residual polymers of the polycrystalline silicon manufacturing process.

The production of polysilicon produces an unwanted byproduct of silicon polymers. Before exposure to moisture of any type, the polymers are in their raw state and are called raw polymer. The raw polymers produce HCl gas when exposed to air or moisture. The product becomes unstable when exposed to moisture of any type, becoming hydrolyzed, and then is flammable even in a nitrogen atmosphere. For example, if the silicon polymers are exposed to moisture in the atmosphere they may spontaneously and violently deflagrate from the heat of hydrolysis. The polymers exposed to moisture may also spontaneously and violently deflagrate from static discharge, by changes in pressure, from friction, and from impact. These reactions are extremely exothermic.

The proposed invention is a method to treat the polymer byproducts in a manner that controls the rate of reaction. The reaction rate can be controlled by regulating the fill pressure of reactant gas, controlling the amount of oxygen in the reactant gas, and stripping of the raw polymer with heat and or vacuum. The weight of polymer, ratio of equipment volume to polymer weight, and exposed surface area of the polymer determine reaction rate; however, they are typically set by the system and so must be well understood for accurate calculations. The solid byproduct remaining after treating the polymer, which is predominately silicon suboxides ($SiO_x$) and silicon dioxide ($SiO_2$), is inert and is easily removed. The byproduct gas after treatment, which is predominately $Cl_2$, may be safely treated, by purging to a scrubber for instance, without exposure to workers. This invention treats the flammable byproduct in a controlled manner to reduce worker exposure to hazards such as deflagration and noxious HCl fumes.

For example, the polymer inactivation method of the invention has the following steps:

providing a sealable vessel containing silicon polymer compounds which are a byproduct of a production of polycrystalline silicon in a Siemens process or a byproduct from a silicon epitaxy reactor;

sealing the vessel to close the vessel to prevent gas or fluid leaking from the vessel;

filling the vessel with an inert gas (nitrogen or argon, for example);

pulling a partial vacuum on the vessel; and adding a second gas to the vessel to cause a reaction between the second gas and the silicon polymers (the second gas is an oxygen containing gas, for example breathing air, lab grade $O_2$, welding oxygen, instrument air, a custom blend of nitrogen and oxygen to any amount like a 15% blend of oxygen with 85% nitrogen, etc., for reaction with non-hydrolyzed silicon polymers; and pure nitrogen for reaction with hydrolyzed silicon polymers and partially-hydrolyzed silicon polymers);

whereby the silicon polymers are converted, in whole or in part, to silicon dioxide. The conversion of silicon polymers to silicon dioxide is in an amount selected from the group consisting of: about 25%, about 50%, about 75% and about 100%.

The polymer inactivation method can further have a step of adding a third gas to the vessel for the case in which partially-hydrolyzed silicon polymers were treated in the process, the third gas is an oxygen containing gas, for example breathing air, lab grade $O_2$, welding oxygen, instrument air, a custom blend of nitrogen and oxygen to any amount like a 15% blend of oxygen with 85% nitrogen, etc. In this case, partially-hydrolyzed silicon would first be treated with nitrogen and then with an oxygen containing gas as the next treatment step.

The polymer inactivation method can further have a step of adding an additional chemical to the sealable vessel to lower the pressure at which the reaction will occur.

The polymer inactivation method can further have a step of applying heat to the equipment or applying heat in a vacuum as part of a stripping operation to reduce the energy release of the polymer during treatment.

The silicon polymers treated in the process are typically one or more of the following polymers: hydrolyzed $Si_2Cl_6$, partially-hydrolyzed $Si_2Cl_6$, non-hydrolyzed $Si_2Cl_6$, hydrolyzed $Si_2HCl_5$, partially-hydrolyzed $Si_2HCl_5$, non-hydrolyzed $Si_2HCl_5$, hydrolyzed $Si_2H_2Cl_4$, partially-hydrolyzed $Si_2H_2Cl_4$, non-hydrolyzed $Si_2H_2Cl_4$, hydrolyzed $Si_3Cl_8$, partially-hydrolyzed $Si_3Cl_8$, non-hydrolyzed $Si_3Cl_8$, hydrolyzed $Si_4Cl_{10}$, partially-hydrolyzed $Si_4Cl_{10}$, and non-hydrolyzed $Si_4Cl_{10}$.

In another embodiment, for example, the polymer inactivation method of the invention has the following steps:

providing the polycrystalline silicon manufacturing device containing silicon polymer compounds which are a byproduct of a production of polycrystalline silicon in a Siemens process or a byproduct from a silicon epitaxy reactor;

sealing the polycrystalline silicon manufacturing device to close the polycrystalline silicon manufacturing device to prevent gas or fluid leaking from the polycrystalline silicon manufacturing device;

filling the polycrystalline silicon manufacturing device with an inert gas (nitrogen or argon, for example);

pulling a partial vacuum on the polycrystalline silicon manufacturing device; and adding a second gas to the polycrystalline silicon manufacturing device to cause a reaction between the second gas and the silicon polymers (the second gas is an oxygen containing gas, for example breathing air, lab grade $O_2$, welding oxygen, instrument air, a custom blend of nitrogen and oxygen to any amount like a 15% blend of oxygen with 85% nitrogen, etc., for reaction with non-hydrolyzed silicon polymers; and pure nitrogen for reaction with hydrolyzed silicon polymers and partially-hydrolyzed silicon polymers);

whereby the silicon polymers are converted, in whole or in part, to silicon dioxide. The conversion of silicon polymers to silicon dioxide is in an amount selected from the group consisting of: about 25%, about 50%, about 75% and about 100%.

The polymer inactivation method can further have a step of adding a third gas to the polycrystalline silicon manufacturing device for the case in which partially-hydrolyzed silicon polymers were treated in the process, the third gas is an oxygen containing gas, for example breathing air, lab grade $O_2$, welding oxygen, instrument air, a custom blend of nitrogen and oxygen to any amount like a 15% blend of oxygen with 85% nitrogen, etc. In this case partially-hydrolyzed silicon would first be treated with nitrogen and then with an oxygen containing gas as the next treatment step.

The polymer inactivation method can further have a step of adding an additional chemical to the polycrystalline silicon manufacturing device to lower the pressure at which the reaction will occur.

The polymer inactivation method can further have a step of applying heat to the equipment or applying heat in a vacuum as part of a stripping operation to reduce the energy release of the polymer during treatment.

The silicon polymers treated in the process are typically one or more of the following polymers: hydrolyzed $Si_2Cl_6$, partially-hydrolyzed $Si_2Cl_6$, non-hydrolyzed $Si_2Cl_6$, hydrolyzed $Si_2HCl_5$, partially-hydrolyzed $Si_2HCl_5$, non-hydrolyzed $Si_2HCl_5$, hydrolyzed $Si_2H_2Cl_4$, partially-hydrolyzed $Si_2H_2Cl_4$, non-hydrolyzed $Si_2H_2Cl_4$, hydrolyzed $Si_3Cl_5$, partially-hydrolyzed $Si_3Cl_5$, non-hydrolyzed $Si_3Cl_5$, hydrolyzed $Si_4Cl_{10}$, partially-hydrolyzed $Si_4Cl_{10}$, and non-hydrolyzed $Si_4Cl_{10}$.

DETAILED DESCRIPTION OF THE INVENTION

Hereinafter, the polymer inactivation method for a polycrystalline silicon manufacturing device according to the present invention will be described with reference to the figures.

First, an example of the polycrystalline silicon manufacturing device to which the polymer inactivation method is applied will be described.

Figure 1:
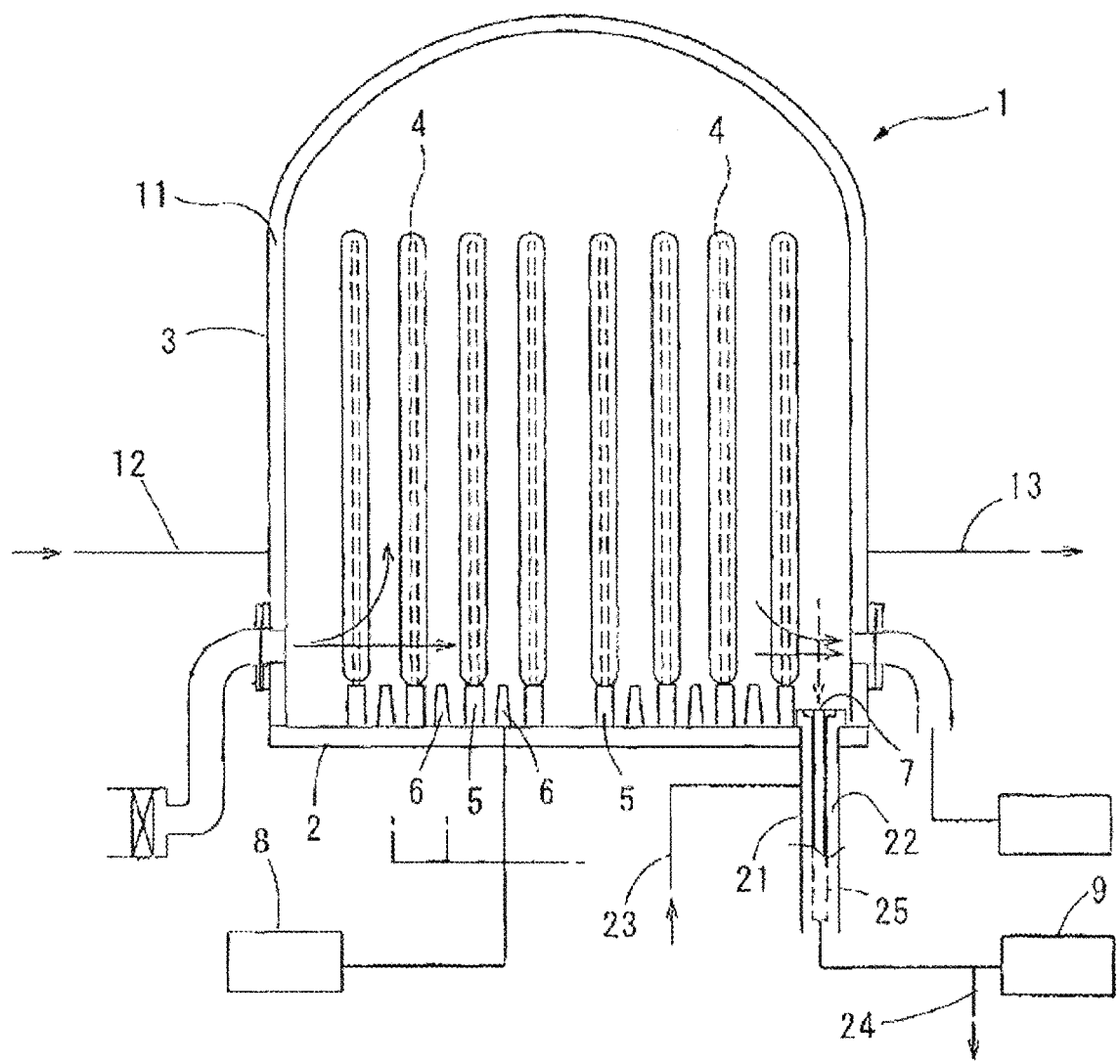
FIG. 1 is a longitudinal sectional view showing an example of a polycrystalline silicon manufacturing device.

FIG. 1 is an overall view of the polycrystalline silicon manufacturing device. A reacting furnace 1 of the polycrystalline silicon manufacturing device is provided with a base 2 and a bell jar 3. The base 2 configures a bottom of the furnace and the bell jar 3 is removably mounted on the base 2 and has a hanging bell shape.

On the base 2, plural pairs of electrodes 5, plural ejection nozzles 6 and plural gas discharge ports 7 are provided. Silicon seed rods 4 are mounted on the plural pairs of electrodes 5, respectively. The ejection nozzles 6 are provided to eject raw material gas including chlorosilane gas and hydrogen gas into the furnace and the gas discharge ports 7 are provided to discharge the gas after the reactions to the outside of the furnace.

In addition, the plural ejection nozzles 6 for the raw material gas are dispersed over substantially the entire upper surface of the base 2 of the reacting furnace 1 at proper intervals therebetween so as to uniformly supply the raw material gas to the silicon seed rods 4. The ejection nozzles 6 are connected to an external raw material gas supply source 8 for the reacting furnace 1. In FIG. 1, only one gas discharge port 7 is shown. However, a plurality of the gas discharge ports are provided on the outer circumferential portion of the base 2 at proper intervals therebetween and are connected to an exhaust gas processing system 9.

The furnace wall of the bell jar 3 has a double-walled jacket structure and is provided with a passage 11 for distributing a heat coolant medium to the inside, and a heat coolant medium supply pipe 12 and a heat coolant medium discharge pipe 13 are connected to the furnace wall.

An exhaust gas pipe 21 from the gas discharge port 7 to the exhaust gas processing system 9 is formed so as to pass through the base 2 of the reacting furnace 1 in a vertical direction and extend downward. Like the wall of the bell jar 3, a pipe wall of the exhaust gas pipe 21 has a double-walled jacket structure and is provided with a passage 22 for distributing a heat coolant medium to the inside, and a heat coolant medium supply pipe 23 and a heat coolant medium discharge pipe 24 are connected to the pipe wall. As in the case of the reacting furnace 1, coolant is distributed during the manufacture of polycrystalline silicon. A carbon sleeve 25 which is slightly smaller than an inner diameter of the exhaust gas pipe 21 is removably inserted into a straight portion which continues from the gas discharge port 7 in the vertical direction in the exhaust gas pipe 21 so as to be suspended from the gas discharge port 7. An inner circumferential surface of the exhaust gas pipe 21 is covered with the sleeve 25.

The exhaust gas processing system 9 separates chlorosilane and hydrogen chloride from unreacted chlorosilane gas and hydrogen gas. According to the exhaust gas processing system 9, the hydrogen gas is recovered and purified to be used as the raw material. Also the chlorosilane is distilled to be used as the raw material.

Next, the method of inactivating polymers adhered to an inner surface of the reacting furnace 1 and an inner surface of the exhaust gas pipe 21 in the polycrystalline silicon manufacturing device having the above-described configuration will be described.

The inactivation of polymers is performed after polycrystalline silicon is manufactured in the reacting furnace 1 of the polycrystalline silicon manufacturing device and before the bell jar 3 is removed from the base 2. First, after the operation of the polycrystalline silicon manufacturing device is stopped, a vacuum is applied in at least the reacting furnace 1 and the exhaust gas pipe 21. The vacuum is applied to remove hydrogen and chlorosilanes, and hydrogen chloride. These gases can be subject to further processing.

Next, nitrogen gas is supplied to the reacting furnace 1 to remove unreacted gas and the inside of the reacting furnace 1 and the exhaust gas pipe 21 are purged with the nitrogen gas. Other inert gases such as argon may be used as the purge gas, but nitrogen is preferred.

After purging the inside of the reacting furnace 1 with nitrogen gas, a partial vacuum between about 5 and about 14.7 psia is pulled in the reacting furnace 1. The partial vacuum is designed to remove nitrogen and any constituents in the reacting furnace 1 atmosphere which could cause a physical or chemical reaction with the silicon polymers. The partial vacuum also decreases the pressure in the reacting furnace 1 and the exhaust gas pipe 21 to below atmospheric pressure (approximately 14.7 psia or 0 psig). The partial vacuum pressure will depend on the desired pressure reduction below atmospheric pressure.

The step of pulling a partial vacuum can be performed at ambient temperature.

Once an equilibrium partial vacuum pressure is reached in the reacting furnace 1 and the exhaust pipe 21 at ambient temperature, oxygen, instrument air, or a blend of inert gas and oxygen is metered into the reacting furnace 1 and the exhaust pipe 21. The oxygen will react with the silicon polymers once ignited, which will cause an increase in pressure and temperature in the reacting furnace 1 and exhaust gas pipe 21. The temperature and pressure in the reacting furnace 1 and exhaust gas pipe 21 at any time during the reaction cannot exceed the maximum pressure and temperature ratings of the equipment. Thus the partial vacuum pressure pulled prior to the addition of oxygen and the amount of oxygen added is important to regulating the maximum pressure created later during the reaction.

The oxygen reaction is typically initiated with electrostatic discharge or heated nichrome wire. The total pressure at initiation and fraction of oxygen are critical to maintaining vessel pressure within tolerances. Oxygen will react rapidly with the silicon polymers to create inert silicon suboxides ($SiO_x$), silicon dioxide ($SiO_2$), and chlorine gas ($Cl_2$). The fraction of oxygen is also critical in conversion of polymer to $SiO_2$, with greater amounts of oxygen yielding higher conversion to $SiO_2$, which is easier to clean than silicon suboxides. Chlorine gas can be safely discharged, collected from the reacting furnace 1 and the exhaust pipe 21 and treated without exposure to workers. Silicon dioxide, $SiO_2$, is in the form of fumed silica and can be removed by blowing it out of the equipment with air. Much of it can be removed before the bell jar 3 is opened.

The temperature and pressure conditions during the reaction should be regulated so that 100% of the silicon polymers react and the maximum pressure and temperature ratings of the equipment are not exceeded. To accomplish complete reaction may require several cycles of pulling a vacuum and metering oxygen and ignition so as not to react too much polymer and exceed pressure design specifications. This will ensure safety during the reaction and after the reaction when the equipment is opened and the inside is exposed to the atmosphere.

Although this disclosure has discussed the treatment of a reaction furnace, the process may be used for any pressure containing equipment that contains polymer such as sections of piping, heat exchangers, and wash towers. The piping and equipment need not be in-line for treatment. Piping or equipment that has been isolated by valves or blind flanges may be removed and then treated in the previously described manner in a dedicated facility.

Although the present invention is used to treat the byproducts of the polycrystalline silicon manufacturing process, other chemical reactions and processes like silicon epitaxy produce the same polymers. The polymers are of the general form $Si_xH_yCl_z$ where $x>=2$, y may be zero and is typically zero to 3, and $z>=3$ and is typically 3 to 16. The byproduct is a mixture of products of the generic form $Si_xH_yCl_z$. This reaction is not highly sensitive to the structure or length of polymer chains, and one skilled in the art could easily reproduce the reaction for polymers with contaminants such as metals and carbon. The process has been shown to work on the partially-hydrolyzed products with Si—Si chain replaced with Si—O—Si. The process also works with the functional groups Si—H and Si—Cl groups partially-hydrolyzed with Si—OH groups.

Examples of silicon polymers treated in the process of the invention are one or more of the following polymers: hydrolyzed $Si_2Cl_6$, partially-hydrolyzed $Si_2Cl_6$, non-hydrolyzed $Si_2Cl_6$, hydrolyzed $Si_2HCl_5$, partially-hydrolyzed $Si_2HCl_5$, non-hydrolyzed $Si_2HCl_5$, hydrolyzed $Si_2H_2Cl_4$, partially-hydrolyzed $Si_2H_2Cl_4$, non-hydrolyzed $Si_2H_2Cl_4$, hydrolyzed $Si_3Cl_8$, partially-hydrolyzed $Si_3Cl_8$, non-hydrolyzed $Si_3Cl_8$, hydrolyzed $Si_4Cl_{10}$, partially-hydrolyzed $Si_4Cl_{10}$, and non-hydrolyzed $Si_4Cl_{10}$.

An alternative method of initiating the process is by charging oxygen containing gas to the system until the system undergoes auto-ignition. The advantage of this implementation is that the conversion to $SiO_2$ is almost complete. The disadvantages include an unpredictable initiation pressure and the possibility in exceeding equipment pressure rating. Exposing the silicon polymer to moisture and elevated temperatures will affect the subsequent reaction with oxygen. For example, to reduce the amount of oxygen required to start the reaction by 95% or more, water or humidified gas can be added to the raw polymer before introducing the fill gas. To reduce the amount of oxygen required to start the reaction by 90% or more, dry hydrolyzed polymer can be added to the raw polymer before introducing the fill gas. Using heated oxygen has initiated the reaction in a vacuum below 7.5 psia when the fill gas temperature was 90° F.

Alternate methods may be employed where a vacuum is not required at all and pure oxygen is metered to a positive pressure. The treatment gas need not be pure and may be any gas containing oxygen, preferably a mixture of oxygen and an inert gas such as nitrogen, for example breathing air, lab grade $O_2$, welding oxygen, instrument air, a custom blend of nitrogen and oxygen to any amount like a 15% blend of oxygen with 85% nitrogen, etc.

Alternate methods to initiate the reaction may be accomplished. An example is injecting moisture to partially hydrolyze material thereby releasing energy. One skilled in the art could initiate the reaction through a variety of methods.

Experiments

Experiments were conducted in a 1.8 L volume bomb calorimeter to determine pressure rise after intentional ignition by heated nichrome wire. This test vessel was fitted with a high speed pressure transducer. The pressure transducer provided peak equipment pressure. Peak vessel pressure was dependent on the amount of polymer, the type of polymer, the reaction atmosphere surrounding the polymer, the initial vessel temperature, and the initial vessel pressure. The peak pressure was converted to a peak release of energy by utilizing the ideal gas law.

First, silicon polymers were harvested from the polycrystalline silicon manufacturing device in FIG. 1 in an inert and dry atmosphere with no moisture. A few ounces of raw polymer were collected in this inert and dry atmosphere. The polymers adhered to an inner surface of a reacting furnace and piping in a polycrystalline silicon manufacturing device have a viscous honey-like consistency. The raw polymer was used in this state and loaded to the test vessel in a glovebox in a dry nitrogen atmosphere.

To conduct hydrolyzed polymer tests, hydrolyzed polymer was prepared by the following method: raw polymer was placed in a beaker and filled with excess water at ambient temperature. The resulting white solid was decanted and then dried on a hotplate at 50° C. for three days. The dried sample was highly combustible even in an inert atmosphere.

After loading the polymer into a combustion capsule and sealing them inside the test vessel, the appropriate fill gas was attached to the vessel lid and charged for testing. For tests without vacuum, the system was purged with the fill gas for five minutes and then brought to the test pressure before ignition. For vacuum experiments, the vessel was brought to 0.07 psia through tubing on the lid connected to a vacuum pump and then charged with the fill gas to the appropriate pressure.

Figure 3:
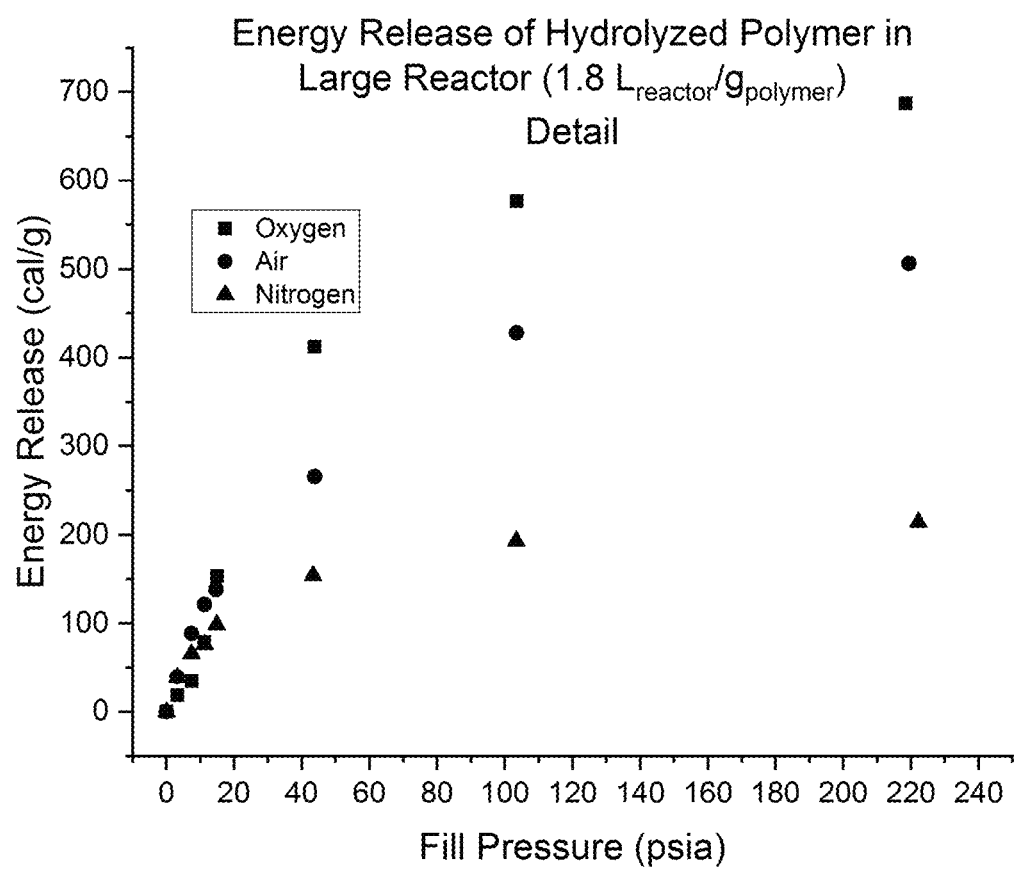
FIG. 3 is a graph showing hydrolyzed polymer energy release in a large reactor.
Figure 4:
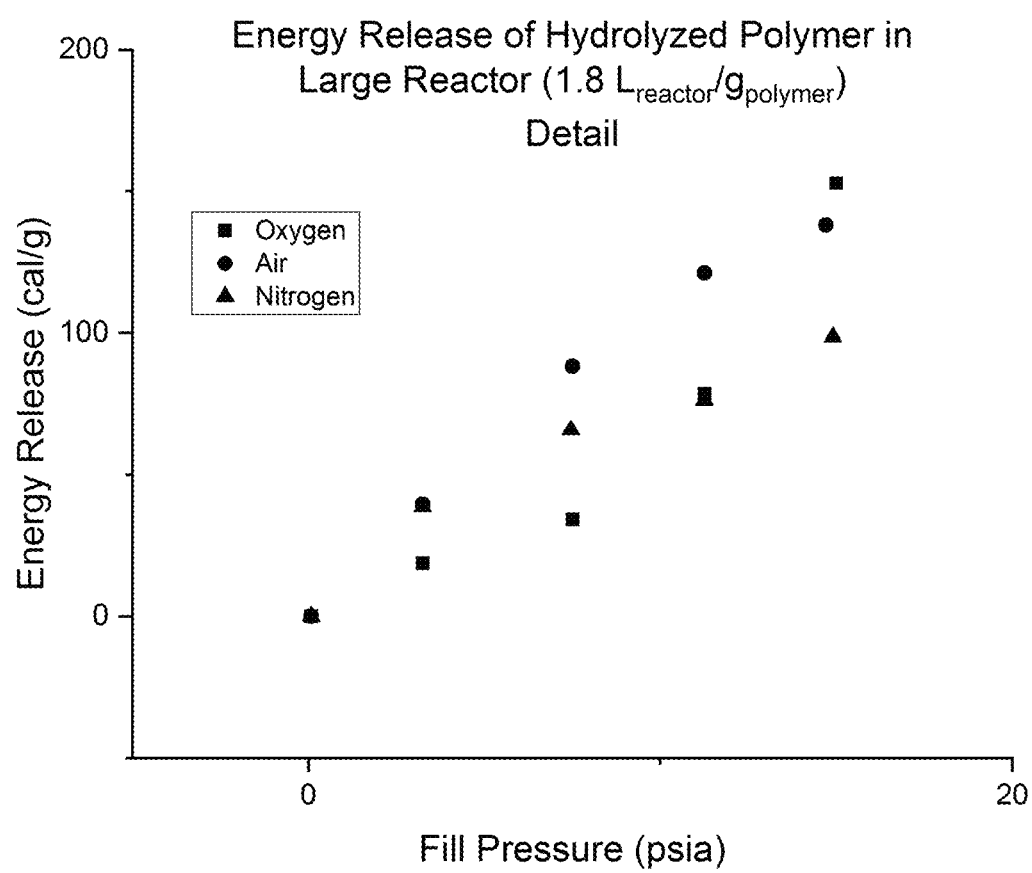
FIG. 4 is a graph showing detailed hydrolyzed polymer energy release.
Figure 5:
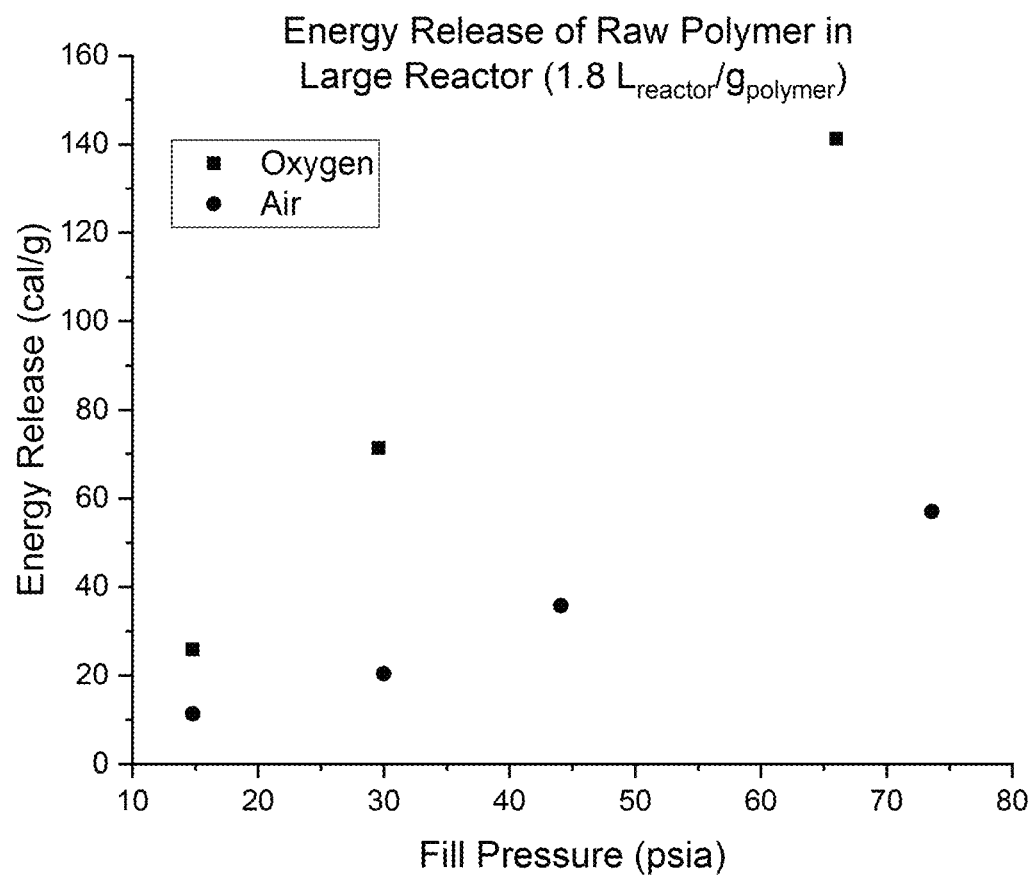
FIG. 5 is a graph showing raw polymer energy release in large reactor.

For a given fill pressure, FIGS. 3 through 5 (FIG. 3: Is a graph showing hydrolyzed polymer energy release in a large reactor; FIG. 4: Is a graph showing detailed hydrolyzed polymer energy release; FIG. 5: Is a graph showing raw polymer energy release in large reactor) show the energy release in the vessel per 1 gram of sample. The vessel was filled with oxygen, air, or nitrogen to the specified initial pressure.

Figure 6:
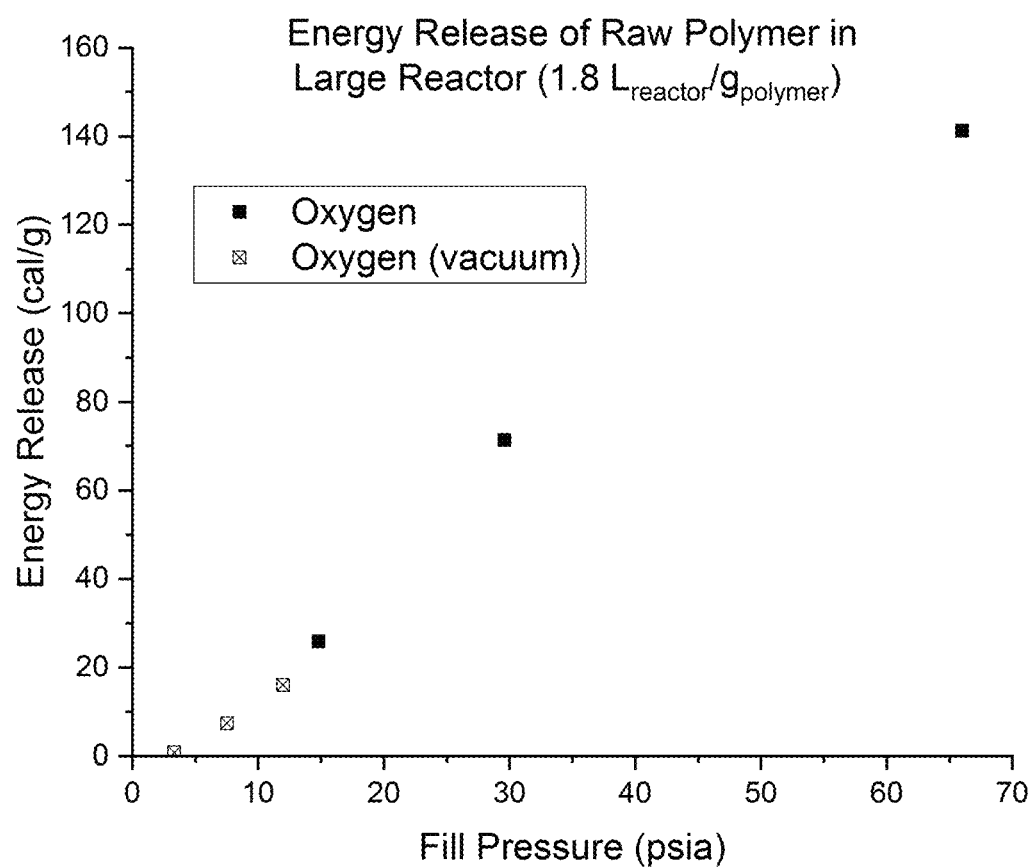
FIG. 6 is a graph showing raw polymer energy release in large reactor with vacuum
Figure 7:
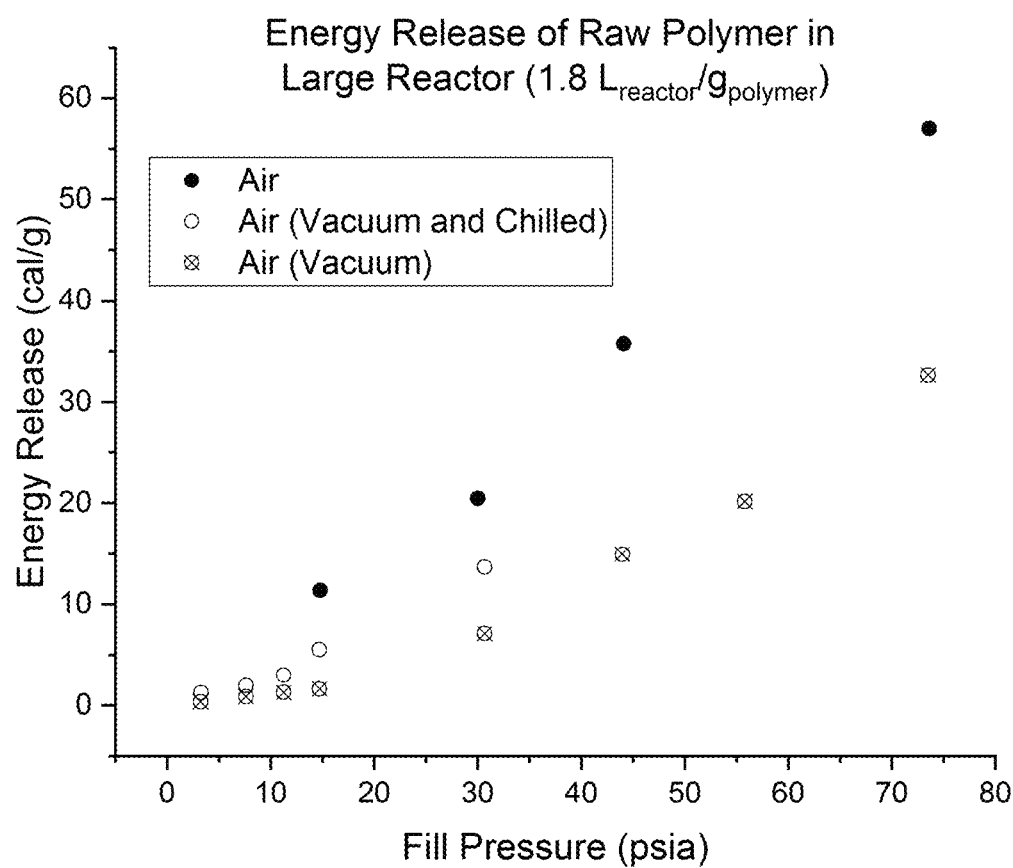
FIG. 7 is a graph showing raw polymer energy release and treatment method.
Figure 8:
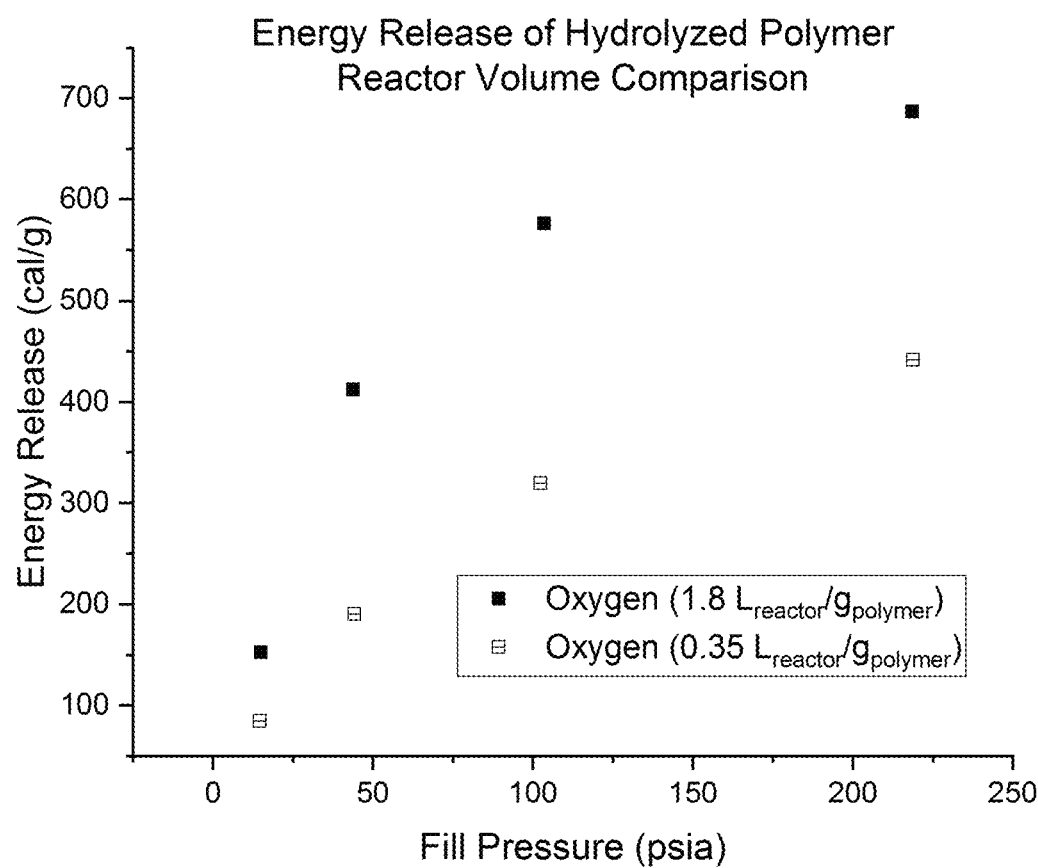
FIG. 8 is a graph showing equipment volume comparison for oxygen in hydrolyzed polymer.

The energy released by the polymer was reduced when placed in a vacuum to 0.07 psia and subsequently charged with reactant gas to the fill pressure. The vacuum stripped some of the more volatile polymer components from the viscous liquid. A greater percent of the viscous polymer was volatized at higher stripping temperature resulting in even less energy release. The effect of vacuum on raw polymer in an oxygen atmosphere is shown in FIG. 6 (FIG. 6: Is a graph showing raw polymer energy release in large reactor with vacuum). The effect of vacuum stripping combined with temperature on raw polymer in an atmosphere of air is shown in FIG. 7 (FIG. 7: Is a graph showing raw polymer energy release and treatment method). The chilled polymer was placed in a capsule at 21.9° F., which resulting in a frozen skin forming around the polymer liquid.

Figure 9:
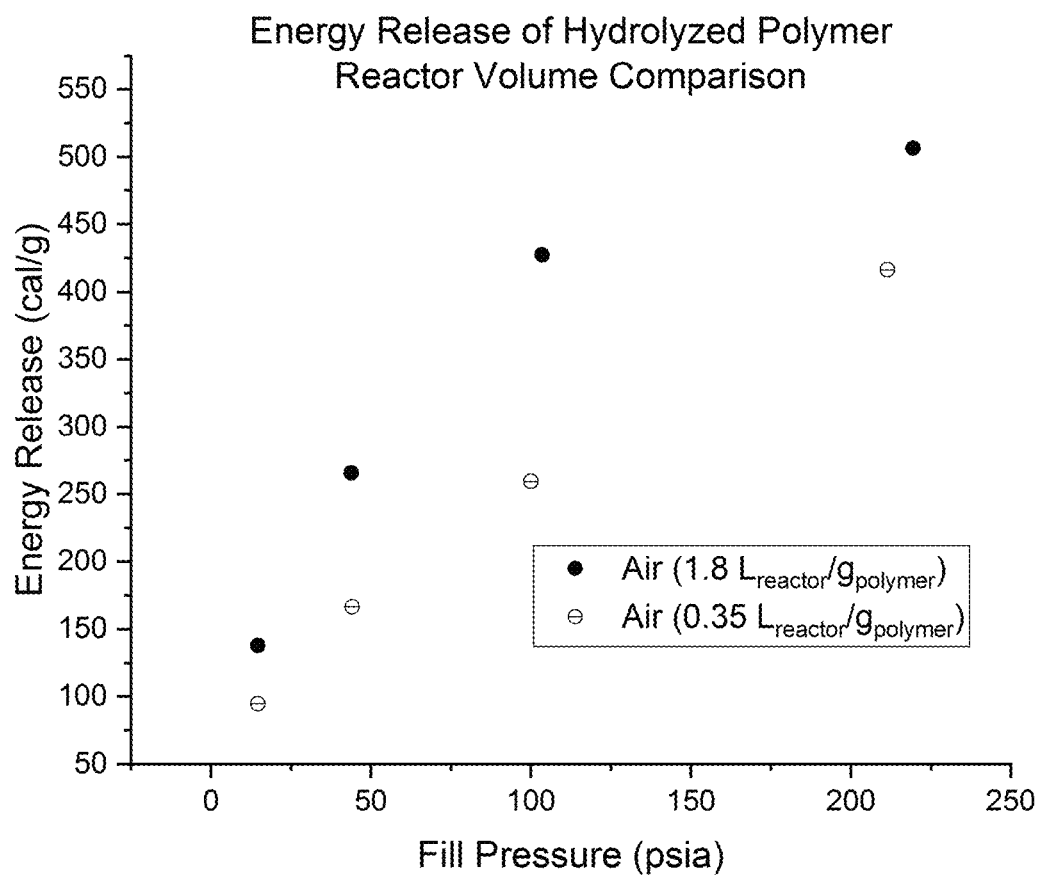
FIG. 9 is a graph showing equipment volume comparison for air in hydrolyzed polymer.
Figure 10:
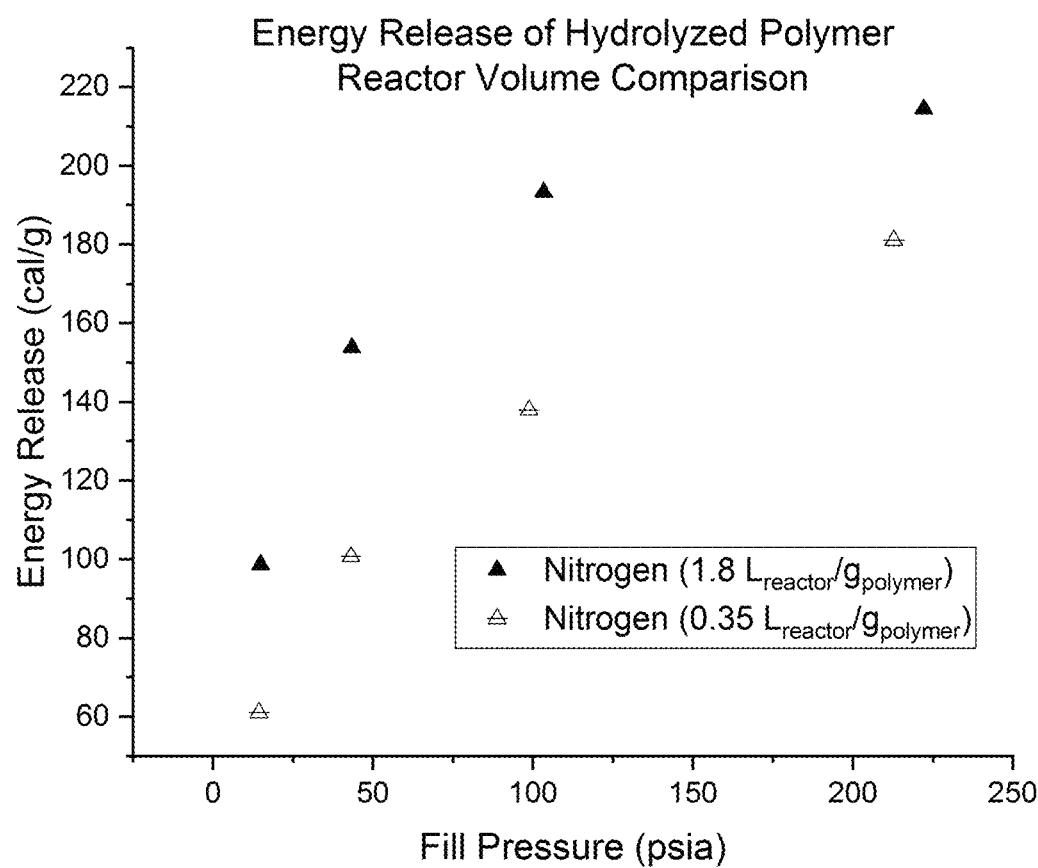
FIG. 10 is a graph showing equipment volume comparison for nitrogen in hydrolyzed polymer.
Figure 11:
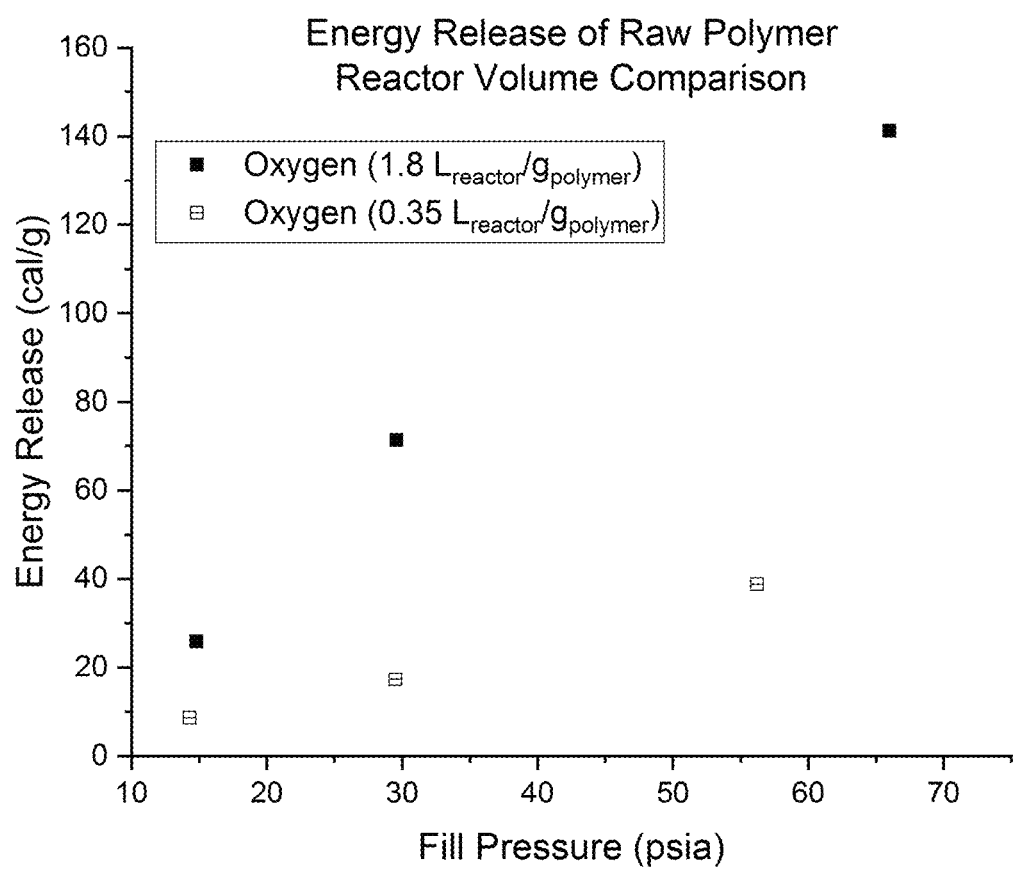
FIG. 11 is a graph showing equipment volume comparison for oxygen in raw polymer.
Figure 12:
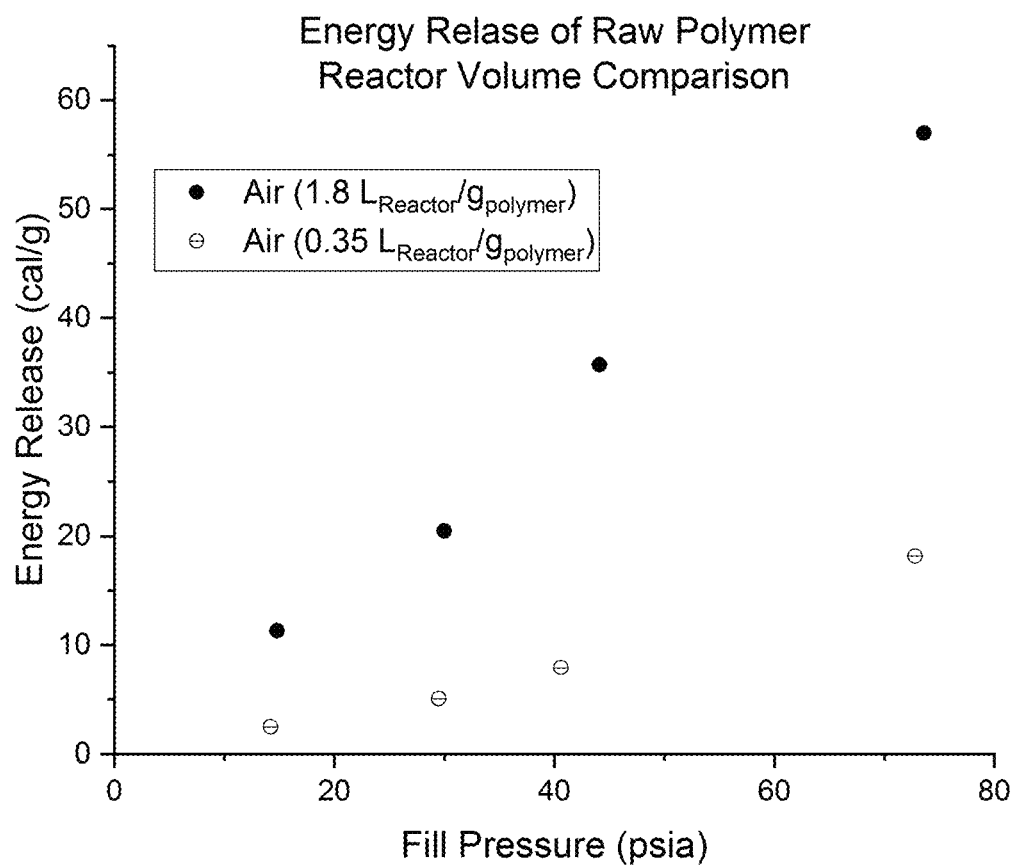
FIG. 12 is a graph showing equipment volume comparison for air in raw polymer.

Most piping equipment has a smaller ratio of atmosphere to polymer weight. For this reason, the polymer was tested in a smaller reaction vessel of 0.35 L with the same 1 gram of polymer samples. Testing was conducted in the same manner as was completed in the larger vessel. FIGS. 8 through 12 (FIG. 8: Is a graph showing equipment volume comparison for oxygen in hydrolyzed polymer; FIG. 9: Is a graph showing equipment volume comparison for air in hydrolyzed polymer; FIG. 10: Is a graph showing equipment volume comparison for nitrogen in hydrolyzed polymer; FIG. 11: Is a graph showing equipment volume comparison for oxygen in raw polymer; FIG. 12: Is a graph showing equipment volume comparison for air in raw polymer) show the effect of the reactor's smaller volume on energy release of the polymer. In every case, the smaller equipment volume resulted in less peak energy from the polymer.

Figure 13:
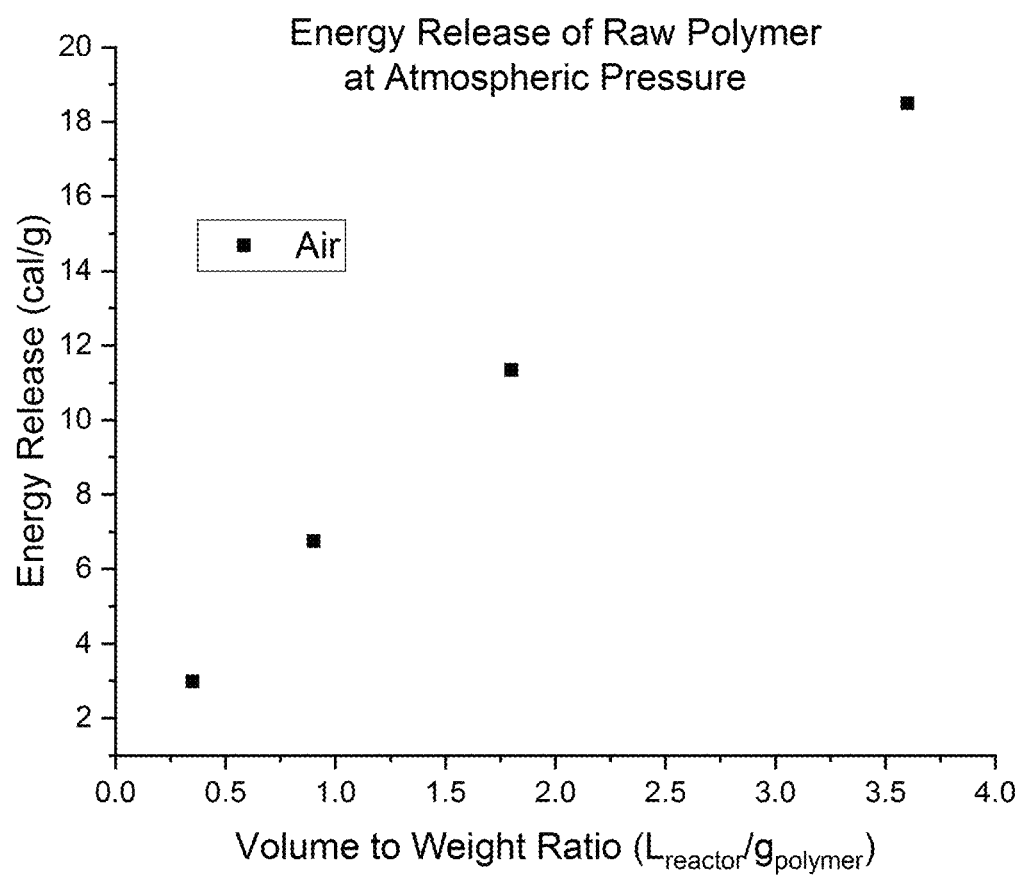
FIG. 13 is a graph showing volume of fill gas to weight of raw polymer in air.

In the large test vessel, experiments were conducted to change the ratio of atmosphere to polymer weight by varying the weight of raw polymer added to the test capsule. The tests were conducted at atmospheric pressure. The testing results are shown in FIG. 13 (FIG. 13: Is a graph showing volume of fill gas to weight of raw polymer in air). More energy is released as the ratio of volume in the reactor per weight of polymer increases.

Figure 14:
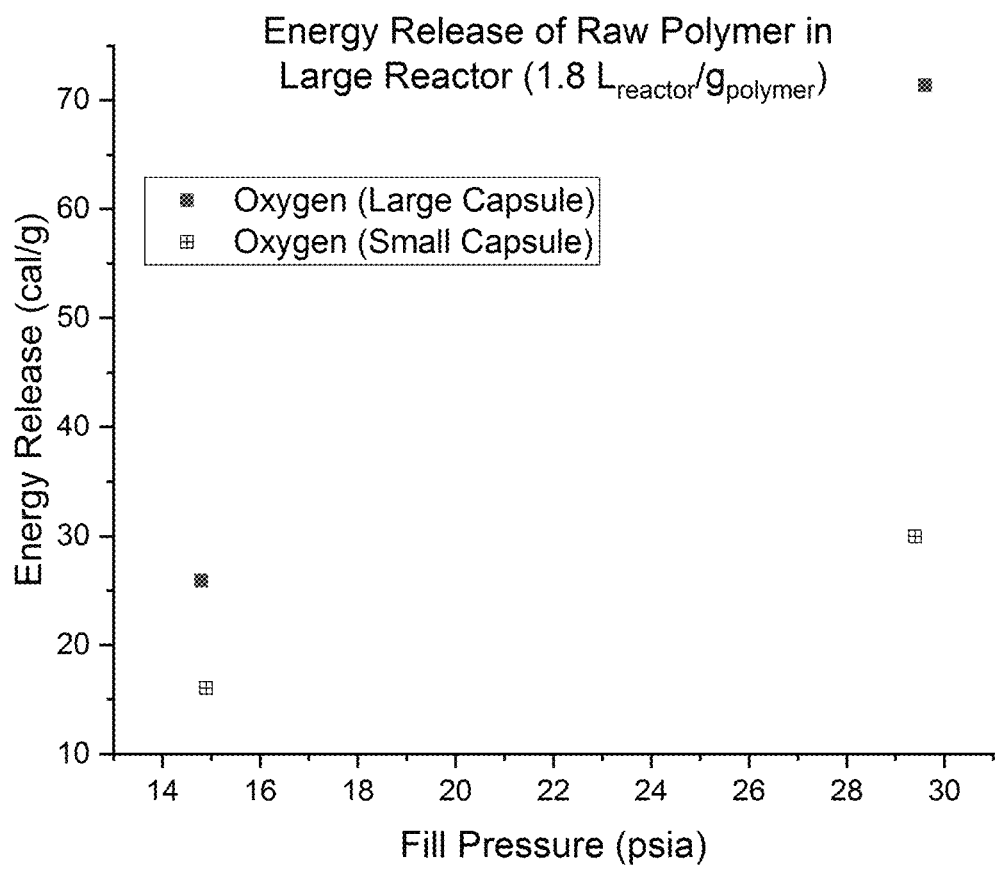
FIG. 14 is a graph showing comparison of polymer surface area for raw polymer in oxygen.

An equipment factor that affects energy release is the surface area of the polymer. For hydrolyzed polymer, tightly packed polymer produced the largest energy release. The polymer was packed in the crucible for all hydrolyzed tests. This is the most likely state of hydrolyzed polymer in equipment and pipes. Raw polymer released the most energy when it was allowed to flow freely and maximize its surface area. Two sized combustion capsules were used to compare the surface area effect of energy release on raw polymer. The smaller capsule measures 1" in diameter and is 7/16" deep. The larger capsule measures 1.5" in diameter and is 7/8" deep. The effect of exposed surface area on raw polymer energy release is shown in FIG. 14 (FIG. 14: Is a graph showing comparison of polymer surface area for raw polymer in oxygen).

The raw polymer in the small crucible filled the entire 1" diameter; however, the polymer in the 1.5" diameter vessel spread out until it naturally stopped flowing due to its high viscosity. The larger surface area released a much larger amount of energy. The large crucible reproduces the worst case scenario for the raw polymer surface area exposed in a pipe or equipment. In practice the polymer tends to pool at the bottom of piping or equipment thereby decreasing its surface area.

The test results were conducted with hydrolyzed polymer as well as raw polymer. The energy released by the polymer is a function of many variables which need to be carefully considered before ignition of polymer in industrial equipment. The energy release is a function of:

Amount of polymer;
Degree of polymer hydrolyzation;
Ratio of gaseous volume of equipment to mass of polymer;
Amount of oxygen in gaseous volume of equipment; and
Surface area of polymer exposed to gaseous volume.

Combustion of hydrolyzed polymer is extremely exothermic and therefore very difficult to control. If possible, there will be little or no hydrolyzed polymer in the vessel before treatment gas is metered as a safety precaution. The results found in FIGS. 3-14 may be used to estimate pressure rise in larger equipment with greater amounts of polymer given the appropriate calculation adjustments. The charts allow the user to treat the polymer and predict a vessel's maximum pressure during treatment.

Figure 2:
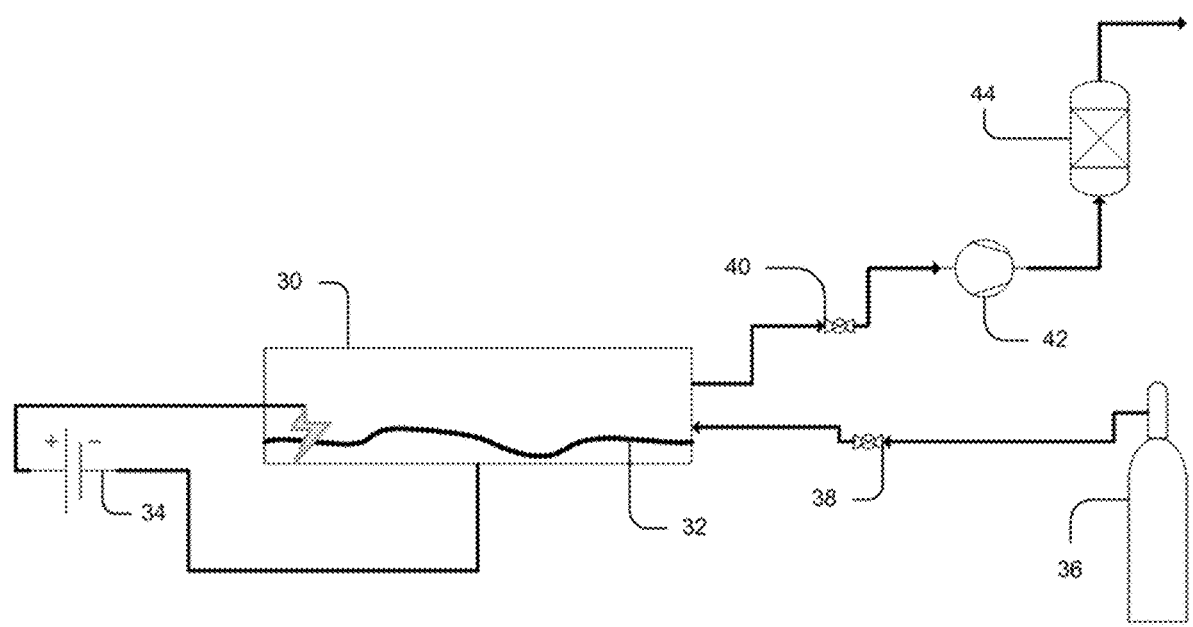
FIG. 2 is a process flow diagram of a polymer treatment system facility.

Three examples are given of treating piping in a dedicated polymer treatment facility. FIG. 2 is a process flow diagram of the polymer treatment facility. FIG. 2 shows a pipe 30 with silicon polymer 32 connected to a grounded power source 34. The pipe 30 with silicon polymer 32 is filled by a fill gas source 36 connected via piping to a fill valve 38 connected via piping to the pipe 30. The pipe 30 is exhausted via different piping which connects the pipe 30 to a vent valve 40 which is connected via piping to a vent pump 42 which is connected via piping to a scrubber 44 for scrubbing the chemicals in the exhaust gas.

Example 1: Treatment of Raw Polymer in a Pipe

A 1.5 inch diameter schedule 80 pipe that is five feet long is isolated from the process and brought to a dedicated polymer treatment facility. Engineering has rated this pipe spool for 180 psia of pressure. The blind flanges are fitted with a multiple use electric discharge probe that sparks to the grounded pipe wall. The pipe contains 1 gram of raw polymer. The volume ratio to polymer ratio is about 1.8 L (0.0018 m³) to 1 gram. As a safety precaution to check for hydrolyzed polymer, the pipe is evacuated to 0.07 psia, charged to 3.25 psia with nitrogen and the ignition system is discharged. There is no increase in pressure confirming the pipe was removed in a fashion that prevented moisture from entering the pipe. The pipe is evacuated to 0.07 psia and then charged with pure oxygen to 11.25 psia. Since the volume to weight ratio of polymer is 1.8 L/g, FIG. 6 may be used, and it is determined that in these conditions the polymer will release 16 cal/g of energy. Since we have one gram of polymer, we expect 16 cal (67 J) of energy release. The pressure rise is calculated by simultaneously solving the amount of energy equivalent to a change in gas temperature at constant volume Eq. 3 and the ideal gas law Eq. 4 to yield Eq. 5.

$$Q = nC_v \Delta T \quad (3)$$

$$\Delta PV = nR\Delta T \quad (4)$$

$$\Delta P = \frac{QR}{C_v V} \quad (5)$$

Substituting the system values into Eq. 5 provides the pressure rise in the system in pascal.

$$\Delta P = \frac{67 \, J * 8.31446 \frac{m^3 Pa}{mol-K}}{21.08721 \frac{J}{mol-K} 0.0018 \, m^3} = 14{,}676 \, Pa \quad (6)$$

The pressure rise in the pipe will be 2.1 psi (14676 Pa) increasing from 11.25 psia and peaking at 13.35 psia, which is well within the pipe's design pressure. The reacted gas is vented to a scrubber through a vacuum pump and the process is repeated until no pressure rise is detected to ensure complete conversion of the polymer. The system is carefully opened and cleaned with high pressure water. The operator is dressed in appropriate PPE for a flash fire and is careful to monitor for HCl fumes indicating an incomplete treatment process.

Example 2: Treatment of Hydrolyzed Polymer in a Pipe

A 1.5 inch diameter schedule 80 pipe that is five feet long is isolated from the process and brought to a dedicated polymer treatment facility. Engineering has rated this pipe spool for 180 psia of pressure. The blind flanges are fitted with a multiple use electric discharge probe that sparks to the grounded pipe wall. The pipe has 5 grams of hydrolyzed polymer. The volume ratio to polymer ratio is about 0.35 L (0.00035 m³) to 1 gram. The pipe is evacuated to 0.07 psia and then charged with nitrogen to 14.7 psia. Since the volume to weight ratio of polymer is about 0.35 L/g, FIG. 10 may be used, and it is determined that in these conditions the polymer will release 62 cal/g of energy. Since we have five grams of polymer, we expect 310 cal (1297 J) of energy release. The pressure rise is calculated with Eq 5 to yield Eq 7.

$$\Delta P = \frac{1297 \, J * 8.31446 \frac{m^3 Pa}{mol-K}}{20.81396 \frac{J}{mol-K} 0.0018 \, m^3} = 287{,}837 \, Pa \quad (7)$$

The pressure rise in the pipe will be about 42 psi (287,837 Pa) increasing from 14.7 psia and thereby peaking at 56.4 psia. The peak pressure is less than half the rating of the pipe so the pressure rise is considered acceptable. The reacted gas is vented to a scrubber through a vacuum pump and the process is repeated until no pressure rise is detected to ensure complete conversion of the polymer. The system is carefully opened and cleaned with high pressure water. The operator is dressed in appropriate PPE for a flash fire.

Example 3: Treatment of Large Amounts of Raw Polymer in a Pipe

A 1.5 inch diameter schedule 80 pipe that is five feet long is isolated from the process and brought to a dedicated polymer treatment facility. Engineering has rated this pipe spool for 180 psia of pressure. The blind flanges are fitted with a multiple use electric discharge probe that sparks to the grounded pipe wall. While installing the blind flanges the operator estimated that the pipe was less than $\frac{1}{8}^{th}$ full of polymer by volume. The volume ratio of the pipe to polymer ratio is about 0.00496 L/g. As a safety precaution to check for hydrolyzed polymer, the pipe is evacuated to 0.07 psia, charged to 3.25 psia with nitrogen and the ignition system is discharged. There is no increase in pressure confirming the pipe was removed in a fashion that prevented moisture from entering the pipe. FIG. 13 is referenced and the equipment volume to polymer weight ratio is much smaller than the smallest value on the figure of 0.35 L/g. Two analyses are considered for treatment of the pipe as shown in Table 1.

TABLE 1

Table 1: Analysis of Pipe Treatment with Large Amounts of Raw Polymer

| | Raw Polymer | | | |
|---|---|---|---|---|
| | Analysis 1 | Units | Analysis 2 | Units |
| Polymer Density | 1670 | kg/m³ | 1670 | kg/m³ |
| Pipe Vol. | 0.0614 | ft³ | 0.0614 | ft³ |
| Pipe Vol. | 0.00174 | m³ | 0.00174 | m³ |
| Polymer Vol. | 0.000217 | m³ | 0.000217 | m³ |
| Polymer Weight | 363 | g | 363 | g |
| Pipe Vol. | 1.8 | L | 1.8 | L |
| Pipe Vol. | 0.0018 | m³ | 0.0018 | m³ |
| Equip. Vol. to Polymer Weight Ratio | 0.00496 | L/g | 0.350 | L/g |
| $Q_{specific}$ | 0.735 | cal/g | 3 | cal/g |
| $Q_{total}$ | 267 | cal | 1090 | cal |
| $Q_{total}$ | 1115 | J | 4553 | J |
| R | 8.31446 | m³Pa/mol-K | 8.31446 | m³Pa/mol-K |
| $C_v$ | 20.80046 | J/mol-K | 20.80046 | J/mol-K |
| DP | 247701 | Pa | 1011009 | Pa |
| DP | 35.9 | psi | 147 | psi |
| Peak Pressure | 50.6 | psi | 161 | psi |

Analysis 1 extrapolates FIG. 12 to estimate an energy release of 0.735 cal/g for the equipment volume to polymer weight of 0.00496 L/g. Analysis 2 uses the smallest value that was physically tested of 3 cal/g for an equipment to polymer weight ratio of 0.35 L/g. Analysis 1 reveals that the pressure rise is acceptable; however, analysis 2 is very close to the design pressure of the pipe. The plant must make an executive decision how to best treat the pipe. To mitigate risk, management determines that the pipe will be placed under a vacuum to 0.07 psia and then the pipe wall will be heated with a steam blanket for 24 hours in a stripping operation to reduce the energy potential of the polymer. The off-gas is sent to a scrubbing system during the operation. After the stripping operation and after the pipe has cooled to ambient temperature, the pipe is filled with air to 14.7 psia and the polymer is ignited. The reacted gas is vented to a scrubber through a vacuum pump and the process is repeated until no pressure rise is detected to ensure complete conversion of the polymer. The system is carefully opened and cleaned with high pressure water. The operator is dressed in appropriate PPE for a flash fire and is careful to monitor for HCl fumes indicating an incomplete treatment process.

An earnest attempt was made to test the maximum energy release from the raw and hydrolyzed polymer for the figures provided. The treatment of hydrolyzed polymer is exceptionally dangerous. The reaction rate and thereby the peak pressure of hydrolyzed polymer is dependent on the method by which it was hydrolyzed. Although a method of making extremely reactive hydrolyzed polymer was used, actual polymer in the process may be more reactive than stated in the figures. Even the polymer shape has shown a correlation to reactivity with large chunks of polymer creating a faster reaction than fine grains of polymer collected from the same treatment process. For this reason the figures should be used as a guide to reactivity and extreme caution should be exercised when treating polymer. Industrial equipment may cause unintended increases in pressure that can be caused by: plugged tubing, a traveling pressure front or explosion front, insulated equipment, and equipment not made from metal. If any of the preceding complications exist, the use of this polymer treatment method is not recommended.

The reaction stoichiometry of the raw viscous polymer is thought to proceed by:

$$Si_xH_yCl_z+O_2 \rightarrow (X)SiO_2+((Z-Y)/2)Cl_2+(Y/2)H_2$$

The hydrogen generated further reacts by standard combustion given sufficient oxygen and hydrogen by:

$$(Y/2)H_2+(Y/4)O_2 \rightarrow (Y/2)H_2O$$

Although the preferred method to treat polymer is intentional ignition, a method of auto-ignition of polymer was tested on a bench scale with two types of equipment and is suitable for treating silicon polymers found in industrial equipment. The auto-ignition mechanism referenced in these experiments is not by the typical method of heating the chemical, but by imparting a pressurized gas. The raw silicon polymers were reacted with oxygen or breathing air in a bomb calorimeter and the auto-ignition of the polymer was studied. The results are shown in Table 2.

TABLE 2

Table 2: Pressure at which Auto-Ignition of Raw Polymer Occurs

| Experiment | Vessel Temperature (° F.) | Raw Polymer (g) | Gas | Pressure @ Auto-ignition (psig) |
|---|---|---|---|---|
| 1 | 73 | 1.2 | O₂/Lab Grade | 88.2 |
| 2 | 73 | 1.1 | O₂/Lab Grade | 73.5 |
| 3 | 81 | 1.1 | O₂/Lab Grade | 44.1 |
| 4 | 81 | 1.1 | O₂/Lab Grade | 58.8 |
| 5 | 80 | 1.1 | O₂/Lab Grade | 44.1 |
| 6 | 67 | 1.1 | O₂/Lab Grade | 29.4 |
| 7 | 67 | 1.1 | O₂/Lab Grade | 24 |
| 8 | 80 | 1.1 | O₂/Lab Grade | 14 |
| 9 | 80 | 1.1 | O₂/Lab Grade | 10 |
| 10 | 60 | 1.0 | Breathing Air | 441 |
| 11 | 60 | 1.0 | Breathing Air | 514.5 |
| 12 | 65 | 1.0 | O₂/Lab Grade | 102.9 |
| 13 | 81 | 1.0 | O₂/Lab Grade | 294 |
| 14 | 81 | 1.0 | O₂/Lab Grade | 73.5 |
| 15 | 70 | 2.0 | O₂/Lab Grade | 44.1 |
| 16 | 70 | 2.0 | O₂/Lab Grade | 73.5 |
| 17 | 70 | 2.0 | O₂/Lab Grade | 44.1 |

The same polymer was bench tested in an industrial pipe 1 foot long and 2 inches in diameter. In this system, a vacuum was placed on the system and then oxygen was metered into the pipe. The pressure was recorded by a data logger in conjunction with a pressure transmitter. The maximum recordable pressure for the pressure transmitter was 155 psig. A sample of the viscous polymer was placed directly on the pipe surface with a pipette. The results of industrial pipe testing with additional spikes to reduce auto-ignition pressure are shown in Table 3.

TABLE 3

Table 3: Industrial Testing of Auto-Ignition with Spikes

| Experiment | Polymer Weight (g) | Spike | Spike Vol (liq, mL) Weight (solid, g) | Vessel Temp (° F.) | Initial Vessel Pressure (psia) | Reaction Initiation Pressure (psia) | Max Pressure (psia) | DP (psia) |
|---|---|---|---|---|---|---|---|---|
| 1 | 2.0 | N/A | N/A | 64 | 1.24 | 108.56 | 143.43 | 34.87 |
| 2 | 2.0 | N/A | N/A | 64 | 1.27 | 151.49 | N/A | N/A |
| 3 | 1.0 | Hydrolyzed Polymer | 0.278 | 60 | 1.28 | 25.63 | 36.74 | 11.11 |
| 4 | 1.0 | Hydrolyzed Polymer | 0.261 | 61 | 1.25 | 13.69 | 15.42 | 1.73 |
| 5 | 1.0 | Pure H2O | 0.150 | 65 | 1.28 | 8.02 | N/A | N/A |
| 6 | 1.0 | Pure H2O | 0.150 | 64 | 1.29 | 13.72 | N/A | N/A |

A spike, or additional chemical used to lower the initiation pressure at which the sample will auto-ignite was added as either hydrolyzed polymer or pure water to the viscous polymer. In the cases of experiments 5 and 6, the pressure rise was so small as to be indistinguishable from the base curve. The ignition of the polymer was determined by the sudden increase in temperature of the surface of the vessel for these experiments. The amount of oxygen required to start the reaction was reduced by about 95% when a drop of water was added to the raw polymer immediately before testing. The amount of oxygen required to start the reaction was reduced by 90% when dry hydrolyzed polymer was added to the raw polymer immediately before testing. Separate testing has shown that using oxygen at 90° F. has initiated the reaction in a vacuum below 7.5 psia.

The reaction mechanism of treating silicon polymers with oxygen to produce an inert solid product of $SiO_2$ and silicon sub-oxides and a treatable gaseous byproduct of $Cl_2$ is a novel disclosure. The practical use of treating exposed equipment with this technique is also a novel disclosure that can greatly increase safety in the polysilicon and silicon epitaxy industry.

The present invention is not limited to the embodiments and various modifications may be made without departing from the concept of the present invention.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed as new and desired to be protected by Letters Patent of the United States is:

1. A polymer inactivation method, comprising:
   providing a sealable vessel containing silicon polymers which are a byproduct of a production of polycrystalline silicon in a Siemens process or a byproduct from a silicon epitaxy reactor, wherein the silicon polymers comprise non-hydrolyzed silicon polymers, hydrolyzed silicon polymers and partially-hydrolyzed silicon polymers;
   sealing the sealable vessel to close the sealable vessel to prevent gas or fluid leaking from the sealable vessel;
   filling the sealable vessel with an inert gas selected from the group consisting of nitrogen and argon;
   pulling a partial vacuum on the sealable vessel; and
   adding a second gas to the sealable vessel to cause a reaction between the second gas and the silicon polymer, wherein the second gas is selected from the group consisting of an oxygen containing gas for a reaction with non-hydrolyzed silicon polymers, and pure nitrogen for a reaction with hydrolyzed silicon polymers and partially-hydrolyzed silicon polymers;
   whereby the silicon polymers are converted, in whole or in part, to silicon dioxide.

2. The polymer inactivation method of claim 1, wherein the silicon polymers are selected from the group consisting of: hydrolyzed $Si_2Cl_6$, partially-hydrolyzed $Si_2Cl_6$, non-hydrolyzed $Si_2Cl_6$, hydrolyzed $Si_2HCl_5$, partially-hydrolyzed $Si_2HCl_5$, non-hydrolyzed $Si_2HCl_5$, hydrolyzed $Si_2H_2Cl_4$, partially-hydrolyzed $Si_2H_2Cl_4$, non-hydrolyzed $Si_2H_2Cl_4$, hydrolyzed $Si_3Cl_8$, partially-hydrolyzed $Si_3Cl_8$, non-hydrolyzed $Si_3Cl_8$, hydrolyzed $Si_4Cl_{10}$, partially-hydrolyzed $Si_4Cl_{10}$, and non-hydrolyzed $Si_4Cl_{10}$.

3. The polymer inactivation method of claim 1, further comprising a step of adding a third gas to the sealable vessel containing the partially-hydrolyzed silicon polymers, wherein the third gas is an oxygen containing gas.

4. The polymer inactivation method of claim 1, further comprising adding an additional chemical to the sealable vessel to lower the pressure at which the reaction will occur.

5. The polymer inactivation method of claim 1, wherein the conversion of silicon polymers to silicon dioxide is in an amount selected from the group consisting of: about 25%, about 50%, about 75% and about 100%.

6. A polymer inactivation method for a polycrystalline silicon manufacturing device, comprising:
   providing the polycrystalline silicon manufacturing device containing silicon polymers which are a byproduct of a production of polycrystalline silicon in a Siemens process or a byproduct from a silicon epitaxy reactor, wherein the silicon polymers comprise non-hydrolyzed silicon polymers, hydrolyzed silicon polymers and partially-hydrolyzed silicon polymers;
   sealing the polycrystalline silicon manufacturing device to close the polycrystalline silicon manufacturing device to prevent gas or fluid leaking from the polycrystalline silicon manufacturing device;
   filling the polycrystalline silicon manufacturing device with an inert gas selected from the group consisting of nitrogen and argon;
   pulling a partial vacuum on the polycrystalline silicon manufacturing device; and
   adding a second gas to the polycrystalline silicon manufacturing device to cause a reaction between the second gas and the silicon polymer, wherein the second gas is selected from the group consisting of an oxygen containing gas for a reaction with non-hydrolyzed silicon polymers, and pure nitrogen for a reaction with hydrolyzed silicon polymers and partially-hydrolyzed silicon polymers;

whereby the silicon polymers are converted, in whole or in part, to silicon dioxide.

7. The polymer inactivation method of claim 6, wherein the silicon polymers are selected from the group consisting of: hydrolyzed $Si_2Cl_6$, partially-hydrolyzed $Si_2Cl_6$, non-hydrolyzed $Si_2Cl_6$, hydrolyzed $Si_2HCl_5$, partially-hydrolyzed $Si_2HCl_5$, non-hydrolyzed $Si_2HCl_5$, hydrolyzed $Si_2H_2Cl_4$, partially-hydrolyzed $Si_2H_2Cl_4$, non-hydrolyzed $Si_2H_2Cl_4$, hydrolyzed $Si_3Cl_8$, partially-hydrolyzed $Si_3Cl_8$, non-hydrolyzed $Si_3Cl_8$, hydrolyzed $Si_4Cl_{10}$, partially-hydrolyzed $Si_4Cl_{10}$, and non-hydrolyzed $Si_4Cl_{10}$.

8. The polymer inactivation method of claim 6, further comprising a step of adding a third gas to the polycrystalline silicon manufacturing device containing the partially-hydrolyzed silicon polymers, wherein the third gas is an oxygen containing gas.

9. The polymer inactivation method of claim 6, further comprising adding an additional chemical to the polycrystalline silicon manufacturing device to lower the pressure at which the reaction will occur.

10. The polymer inactivation method of claim 6, wherein the conversion of silicon polymers to silicon dioxide is in an amount selected from the group consisting of: about 25%, about 50%, about 75% and about 100%.

* * * * *